Figure 1:
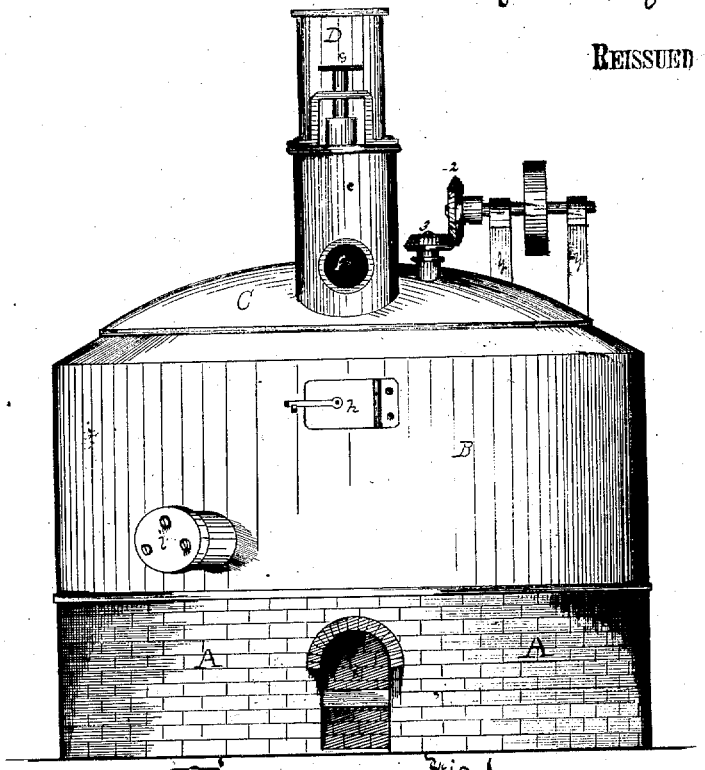

2 Sheets

Sheet 1

Charles Lockhart and John Gracie:

Stills for Hydro-Carbons.

4515

REISSUED AUG 15 1871

Witnesses

R. W. Wentworth

James I. Kay.

Inventors

Charles Lockhart & John Gracie by Bakewell Christy & Kerr their Attorneys

Charles Lockhart and John Gracie:

Sheet 2

Stills for Hydro-Carbons

4515

Witnesses

E. C. Fitler

James I. Kay

Inventors

Charles Lockhart and John Gracie by Bakewell Christy & Co their Attorneys

UNITED STATES PATENT OFFICE.

CHARLES LOCKHART AND JOHN GRACIE, OF PITTSBURG, PENNSYLVANIA.

IMPROVEMENT IN STILLS FOR HYDROCARBONS.

Specification forming part of Letters Patent No. 80,294, dated July 28, 1868; reissue No. 4,515, dated August 15, 1871.

*To all whom it may concern:*

Be it known that we, CHARLES LOCKHART and JOHN GRACIE, of Pittsburg, in the county of Allegheny and State of Pennsylvania, have invented a new and useful Improvement in Stills for the Distillation of Petroleum and other Hydrocarbons; and we do hereby declare the following to be a full, clear, and exact description thereof, reference being had to the accompanying drawing forming part of this specification, which is in two sheets, marked, respectively, A and B.

Our invention relates to stills used for distilling petroleum and other hydrocarbons by means of fire-heat; and consists: First, in an improved arrangement of the fire-chambers relatively to the still. Second, in the application to the still of a double-acting valve to obviate the difficulties arising from sudden change of pressure within the still. Third, in an improved arrangement of scraping device for continuous clearing of the still bottom. Fourth, in an improved device for regulating the height at which the vapors of distillation are carried off from the still.

To enable others skilled in the art to construct and use our improvement, we will proceed to explain the same by reference to the drawing, in which—

Figure 2:
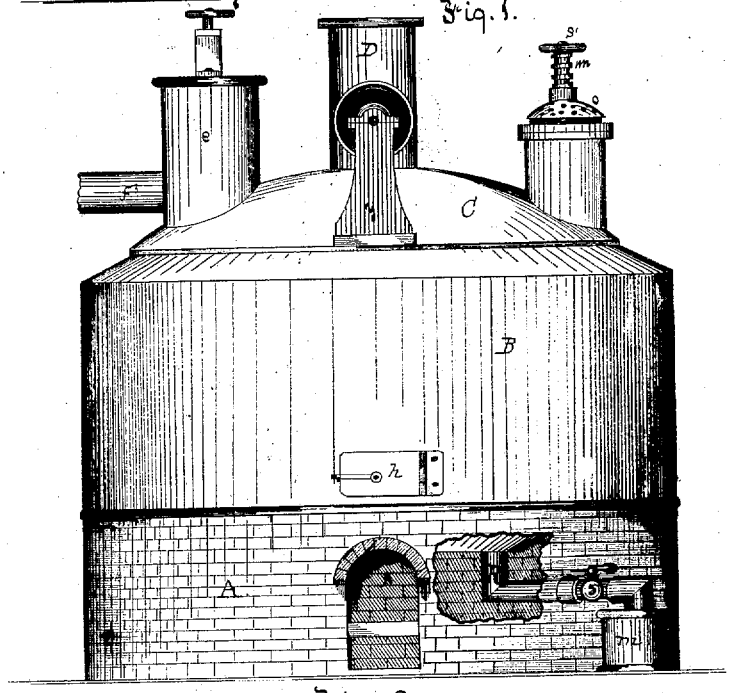
Figure 3:
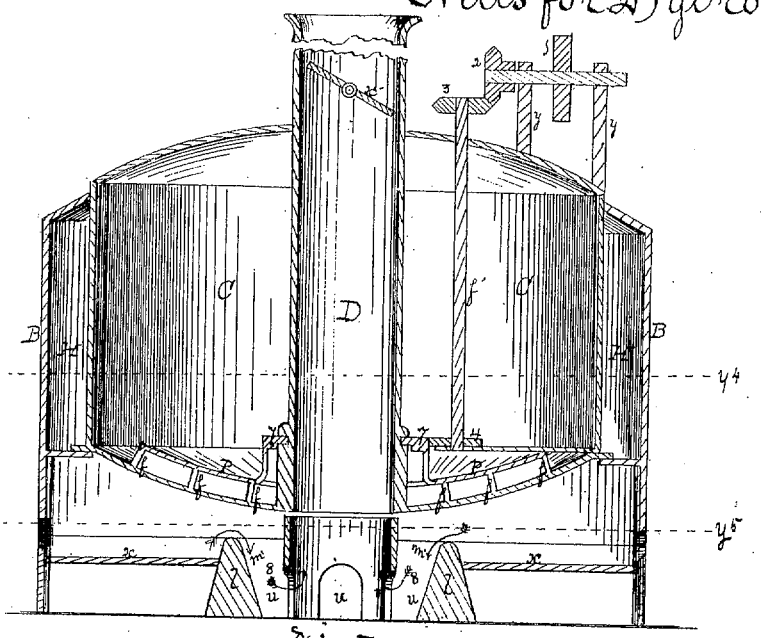
Figure 5:
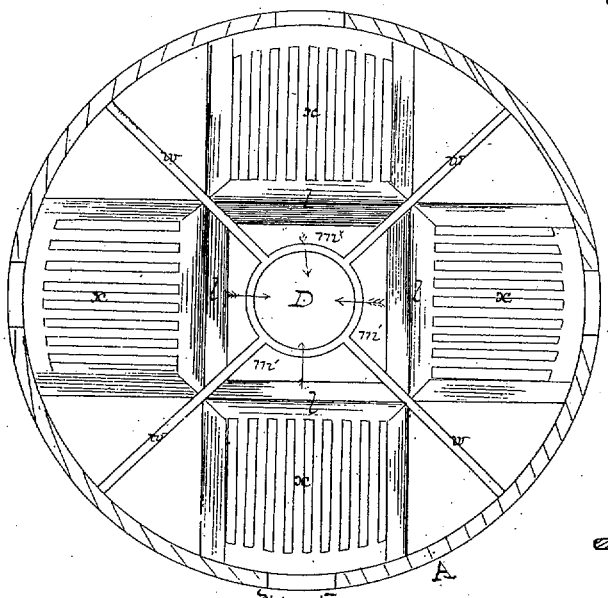
Figure 4:
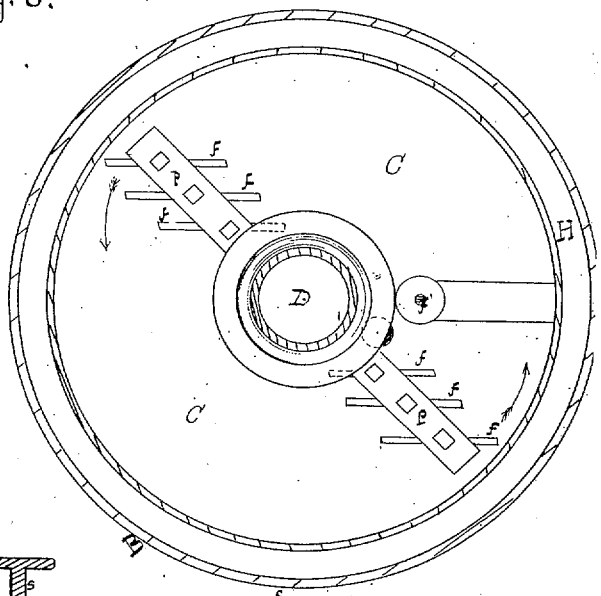
Figure 7:
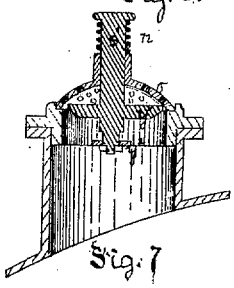
Figure 6:
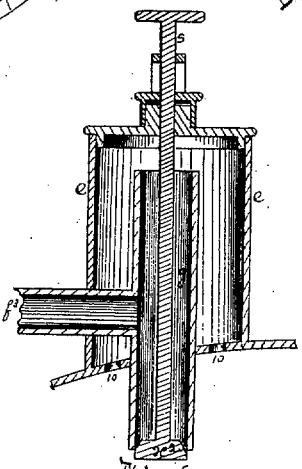

Figures 1 and 2 are side elevations of stills constructed with our improvements, viewed from different points. Fig. 3 is a vertical section through the center of the still in the vertical plane of Fig. 1. Fig. 4 is a horizontal section at the line $y^4$ of Fig. 3. Fig. 5 is a horizontal section at the line $y^5$, Fig. 3. Fig. 6 is a vertical section of the apparatus for regulating the height at which the vapors escape to the condenser, and Fig. 7 is a vertical section of the safety-valve.

In the several figures like letters denote similar parts.

The still C, made of iron or other suitable material, and preferably of cylindrical shape, having its axis vertical, is placed over a suitably-shaped furnace, A. The furnace A consists of a series of any convenient number of fire-chambers (four are shown in the drawing, sheet B, Fig. 5) furnished with fire-grates and bridge-walls *l* at the back, which bridge-walls surround or form a central smoke-chamber, *m'*, under the center of the still, the fire-chambers *x x*, &c., composing the furnace being separated by walls or partitions *w*, and each having an opening in front furnished with a door in the usual manner for the supply of fuel. The central smoke-chamber *m'* connects in any convenient way with the chimney or flue D for carrying off the products of combustion from the fire-chambers *x x*, over the bridge-walls *l*, into the central smoke-chamber *m'*, as shown by the arrows 8 in Fig. 3. The chimney or smoke-flue D enters the bottom of the still C at its center, and may pass vertically through the center of the still, as shown in the drawing, Fig. 3, or may be led off through the still in any other direction, as may be preferred, the vertical position of the chimney above the central smoke-flue not being a necessary part of our improvement. A damper, $x^1$, in the chimney, may serve to regulate the draught through the fire-chambers *x x* so as to adapt the heat of the furnace to the exigencies of the operation of distilling.

The object of arranging a series of fires around the still, converging to a central flue, is to equalize the application of heat to the contents of the still, and this desirable object may be further advanced by surrounding the still with a sheet-iron casing or jacket, B, forming a hot-air space, H, all around it, as shown in Fig. 3, the casing B being furnished with doors *h*, which are to be opened when the still is to be cooled off. The still is furnished also with the usual man-holes for gaining access to its interior and for cooling off after the still has been used.

Fig. 7, sheet B, represents the double-acting safety-valve, which is so constructed as to open outward for relieving any undue pressure within the still and to open inward in the event of any sudden condensation causing a partial vacuum, and may be attached to any convenient part of the still, or to a pipe or goose-neck connecting directly therewith, as may be preferred. The valve consists of a perforated plate, *o*, which may be of the shape of an inverted cup, as shown in the drawing, the circumference of which is seated on the valve-opening, as shown in Fig. 7. Under the perforated plate *o* is a circular disk, $y^1$, which fits up against the perforated plate *o* so as to close all the openings or perforations and prevent air passing down through them into the valve-opening, but which is of smaller diameter than the valve-seat, so that when it is depressed and does not cover the perforations in the plate *o* the external air may pass down through the valve into the still. The disk $y^1$ is attached to or furnished with a stem, $s'$, the upper end of which passes through a sleeve in the perforated plate $o$, and its lower end passes through and is attached to a cross-piece or step, $y^2$, in such a manner as that, while the stem and disk cannot rise further than just to close the perforations on the plate $o$ so as not to raise it from its seat, it may fall sufficiently to allow the passage of air through the perforations in the plate $o$ into the interior of the still. A spiral spring, $n$, is placed around that part of the stem $s'$ which projects above the perforated plate $o$, and presses upward against a button on top of the stem $s'$ and downward on top of the perforated plate $o$. Thus constructed the valve $o$ is always closed, unless the pressure from within the still should overcome the force of the spiral spring $n$, in which case the plate $o$ would rise and allow the escape of vapor, and, if a sudden condensation of the vaporous contents of the still should occur, causing a partial vacuum, the atmospheric pressure from without, acting through the perforations of the plate $o$ on the disk $y^1$, would depress it and allow the air to enter the body of the still. Thus, by means of this double self-acting valve, we provide against the danger caused by undue pressure, either external or internal, in stills used for distilling hydrocarbons.

Our improvement in mode of connecting the scraping device to the still is shown in Figs. 3 and 4. Around the central smoke-flue D, near the bottom of the still, we place an annular plate, marked 7, which enters a groove in the outer surface of the flue D, within the interior of the still C, and fits therein sufficiently loosely to permit of its revolving around the flue D as its axis. To this annular plate 7 are attached the arms P P, extending radially toward the circumference of the still, which arms are furnished with scrapers $f\,f\,f$, set at such an angle as to traverse the surface of the bottom of the still and scrape the tarry sediment or residuum into the pipe R, which pipe conducts it into a receiver, $m$, placed in some convenient position below the still, the pipe R being furnished with a cock, 5, to regulate or shut off the discharge of the residuum at pleasure. The operation of such scrapers and receiver being described in our reissued patent, No. 3,002, of 23d June, 1868, it is unnecessary to enlarge upon it further than to say that in the still constructed as hereinbefore described they are caused to rotate by means of a gear-wheel, marked 4, attached to the shaft $f^1$ and gearing into cog-teeth on the wheel 7. The shaft $f^1$ passes out of the still through a stuffing-box, and is driven by suitable gearing, as shown by the pulley and gear-wheels in 1, 2, and 3, in Fig. 3.

The advantage of the arrangement just described is, that the flue D, serving as a journal for the scraper-wheel to revolve upon, gives the requisite firmness and resistance to enable the scrapers to operate efficiently.

The device for regulating the height at which the vapors of distillation are taken from the still is shown in Fig. 6, Sheet B, and consists of a vertical pipe, $e$, which enters the head of the still at any desired point and opens directly into it; or, if preferred, is connected therewith by perforations 10. Within the vertical pipe $e$ is a smaller pipe, $g$, open at both extremities, the lower end extending down into the still below the lower end of the larger pipe $e$. The pipe $f^3$ leading to the condenser passes through the outer vertical pipe $e$ and opens into the smaller pipe $g$. A valve, $x^2$, is seated in the lower end of the smaller pipe $g$, the stem $s$ of which valve passes up through a stuffing-box in the cap of the larger pipe $e$. By means of the stem $s$ the valve $x^2$ is operated to open or close the lower end of the pipe $g$.

The operation and use of this device are as follows: When the still is first charged with crude petroleum the valve $x^2$ is kept closed, as shown in Fig. 6, in which position the lighter vapors of distillation, having no other exit, pass up the pipe $e$, around the pipe $g$, and thence into the top of the pipe $g$, and out through the pipe $f^3$ to the condenser, the vapor being thus carried off from a point higher than the lower end of the pipe $g$. The vapors which pass off first are those of naphtha and benzine. As soon as the flow of the lighter products from the condenser begins to diminish sensibly the valve $x^2$ may be opened, when the heavier vapors will rise through the pipe $g$ and thence pass into the pipe $f^3$ to the condenser.

The desired change of the height in the still from which the vapors of distillation are carried off to the condenser is readily effected by merely opening or closing the valve $x^2$.

What we claim as our invention, and desire to secure by Letters Patent in stills for distilling hydrocarbons, is—

1. In combination with an upright still, a series of fire-chambers radially arranged around and under the still, such chambers converging to a central smoke-chamber connecting with a flue or chimney, substantially as described.

2. The combination of a series of fire-chambers arranged radially around and under the still with a central flue or chimney passing up the center of the still, substantially as hereinbefore described.

3. The arrangement of the scraper-wheel 7 with the central smoke-flue of the still, so that the latter may form the journal or bearing of the former, substantially as hereinbefore described.

4. The arrangement of the pipe $e$ opening into the still, the pipe $g$ extending below the pipe $e$ into the still and furnished with a valve, $x^2$, and an exit-pipe, $f^3$, substantially as and for the purposes described.

In witness whereof we, the said CHARLES LOCKHART and JOHN GRACIE, have hereunto set our hands.

CHARLES LOCKHART.
JOHN GRACIE.

Witnesses:
THOS. SIMPSON,
I. WHITESELL.